(12) United States Patent
Hockaday

(10) Patent No.: US 8,687,206 B2
(45) Date of Patent: Apr. 1, 2014

(54) OPTICAL DETECTION OF AIRFOIL AXIAL POSITION WITH NSMS

(75) Inventor: Bruce Hockaday, Vernon, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 13/482,076

(22) Filed: May 29, 2012

(65) Prior Publication Data

US 2013/0321824 A1  Dec. 5, 2013

(51) Int. Cl.
*G01B 11/14* (2006.01)
(52) U.S. Cl.
USPC .......................................... 356/614
(58) Field of Classification Search
USPC .............. 356/614–615, 620, 622; 702/150; 415/119; 416/61, 30, 101; 244/17.13, 244/17.11
See application file for complete search history.

(56) References Cited

U.S. PATENT DOCUMENTS

| | | | | |
|---|---|---|---|---|
| 2,455,053 A | * | 11/1948 | Flint | 356/17 |
| 2010/0063767 A1 | * | 3/2010 | Moir | 702/150 |
| 2012/0002038 A1 | * | 1/2012 | Furrer et al. | 348/129 |

* cited by examiner

*Primary Examiner* — Tri T Ton
(74) *Attorney, Agent, or Firm* — Miller, Matthias & Hull LLP

(57) ABSTRACT

A method for determining axial location of rotor blades is provided. The method may monitor an output signal of a sensor configured to detect the proximity of the rotor blades, wherein at least one of the rotor blades being marked with a position marker that is configured to cause a recognizable inconsistency in the output signal only when the rotor blades rotate at a known default axial position. The method may further determine the axial displacement of the rotor blades if the inconsistency is not detected in the output signal for at least one full revolution of the rotor blades.

20 Claims, 8 Drawing Sheets

OPTICAL DETECTION OF AIRFOIL AXIAL POSITION WITH NSMS

FIELD OF THE DISCLOSURE

The present disclosure generally relates to non-intrusive stress measurement systems (NSMSs), and more particularly, to a blade tip timing measurement system for use with gas turbine engines.

BACKGROUND OF THE DISCLOSURE

Non-intrusive stress measurement systems (NSMSs) are generally known for collecting structural data pertaining to gas turbine engine components. For instance, NSMS may be used to quantify any presence of blade vibration or deflection during operation, which may further be correlated to a quantified level of blade stress. Such analyses may be used for the purposes of engine and airfoil design, engine certification processes and/or engine health monitoring.

Blade vibration or deflection is typically derived in part from blade tip timing measurements as captured through an array of sensors, such as optical probes, or the like. For instance, the sensors of a typical NSMS are fixedly disposed within the engine case of an engine and used to detect the passing of the rotor blades or any other indicators externally provided on a rotor of an engine as it rotates during operation. Electrical signals that are output by the sensors can be used to determine the time or distance of arrival of each rotor blade, and the distance of arrival may further be used to determine blade deflection and stress.

As such, the accuracy of any blade stress analyses is dependent upon the integrity of the manner in which blade tip timing measurements are obtained. The integrity of blade tip timing measurements, however, may be compromised by any axial displacement of the blades during operation. Specifically, as engine speed increases, the axial position of the blades may axially move forward relative to the engine case, which may cause the NSMS sensor to interact with a different section of the rotor blade tip. As rotor blades are typically angled relative to its axis of rotation, an unknown offset in the axial position of the rotor may cause errors in the time or distance of arrival of the rotor blades, which may further compound errors in blade stress analyses.

SUMMARY OF THE DISCLOSURE

In accordance with one aspect of the disclosure, a method for determining axial displacement of rotor blades is provided. The method may monitor an output signal of a sensor configured to detect the proximity of the rotor blades, wherein at least one of the rotor blades may be marked with a position marker that is configured to cause a recognizable inconsistency in the output signal only when the rotor blades rotate at a known default axial position. The method may further determine the axial displacement of the rotor blades if the inconsistency is not detected in the output signal for at least one full revolution of the rotor blades.

These and other aspects of this disclosure will become more readily apparent upon reading the following detailed description when taken in conjunction with the accompanying drawings.

Figure 1:
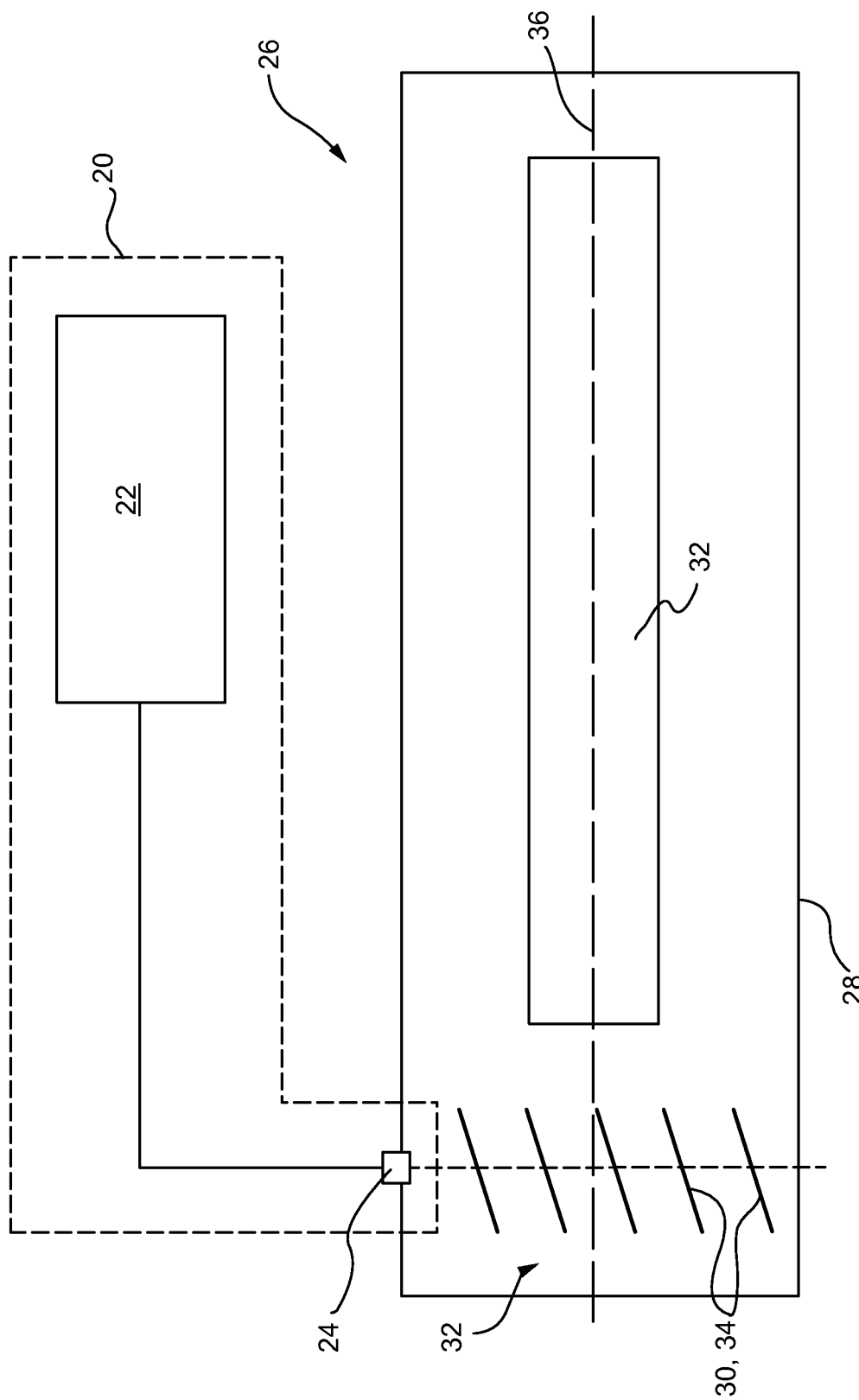
FIG. 1 is a schematic view of one exemplary non-intrusive stress measurement system (NSMS) as provided to a gas turbine engine and constructed in accordance with the teachings of the present disclosure.

While the present disclosure is susceptible to various modifications and alternative constructions, certain illustrative embodiments thereof have been shown in the drawings and will be described below in detail. It should be understood, however, that there is no intention to be limited to the specific forms disclosed, but on the contrary, the intention is to cover all modifications, alternative constructions, and equivalents falling with the spirit and scope of the present disclosure.

DETAILED DESCRIPTION

Referring now to FIG. 1, one exemplary embodiment of a non-intrusive stress measurement system (NSMS) 20 that may be used for determining airfoil axial position or displacement as well as for monitoring engine health is provided. It is to be understood that some of the disclosed embodiments are shown for illustrative purposes and only presented as background for the various components of a general turbine engine and data acquisition systems thereof. Other components of a gas turbine engine as well as controls therefor unnecessary for an understanding of the present disclosure are not described.

As shown in the exemplary embodiment of FIG. 1, the NSMS 20 may essentially include a controller 22 that is operatively coupled to at least one sensor 24, or an array of sensors 24, installed in conjunction with a gas turbine engine 26. More specifically, the one or more sensors 24 may be fixedly disposed within an engine case 28 of the engine 26 and positioned in a manner which enables the sensors 24 to detect the passing of the rotor blades 30 radially extending from the rotor 32 of the engine 26. The sensors 24 may be implemented using one or more of an optical sensor, a magnetic sensor, a Hall-effect sensor, capacitive, or any other suitable sensor capable of outputting a signal corresponding to the proximity of the rotor blades 30 rotating relative thereto.

In the particular embodiment of FIG. 1, one or more of the sensors 24 of the NSMS 20 may employ optical means to detect the presence or the passing of a rotor blade 30 relative thereto. More specifically, each sensor 24 may include an emitter or an optic source configured to emit light towards the rotor blades 30, or the tips thereof, as well as an optical detector configured to detect any light that may be reflected by a rotor blade 30 passing in proximity thereto. The sensors 24 may further be configured to discern the degree of proximity of each passing blade 30 based on the magnitude of light that is received and detected. For example, each sensor 24 may output a continuous analog voltage or current signal to the controller 22 which varies, such as in the form of the signal phase, amplitude and/or frequency, according to the amount of light that is detected. In turn, the controller 22 may compare these variations to predefined thresholds to determine the corresponding proximity of, or at least the presence of, each rotor blade 30 as the rotor 32 rotates within the gas turbine engine 26.

Figure 2:
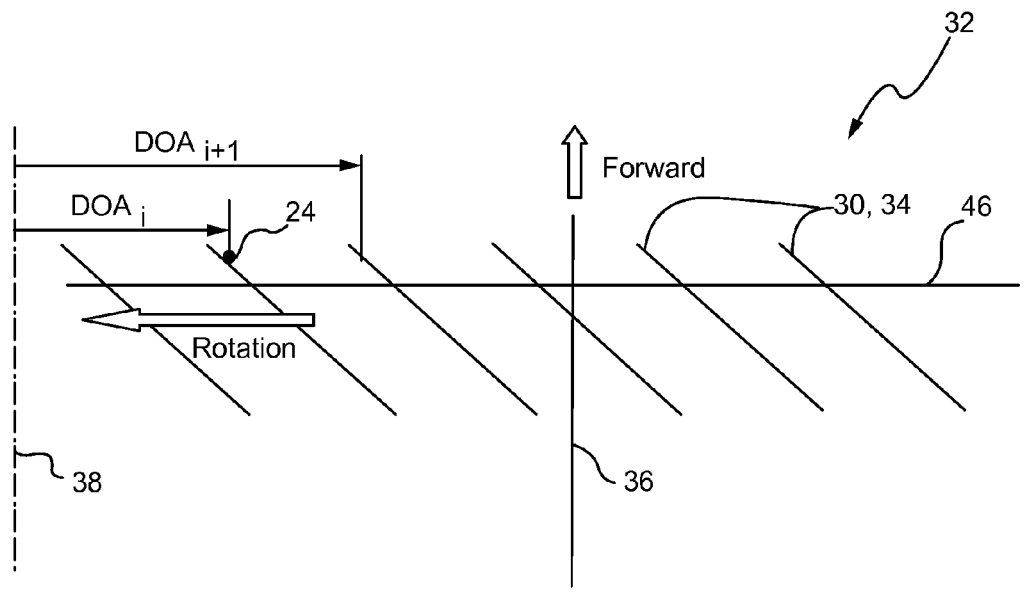
FIG. 2 is a schematic view of an implementation of a NSMS on non-vibrating rotor blades.

Turning to FIG. 2, one exemplary implementation of the NSMS 20 of FIG. 1 is provided. As shown, the probe or sensor 24 of the NSMS 20 may be positioned in proximity to the rotor blades 30, or at least to the blade tips 34 thereof, so as to enable detection of each blade 30 as they rotate about the central axis of rotation or rotor axis 36. Moreover, the controller 22 may be able to determine at least the passing of each blade 30 based on detected changes in the sensor output signals, which in the case of optics-based sensors 24 may correspond to the magnitude of light that is reflected by the rotor blades 30 and the tips 34 thereof. Based on the detected position of each passing blade tip 34, the controller 22 may be able to determine the time of arrival of each blade 30. Furthermore, using the instantaneous angular velocity of the rotor 32, the controller 22 may further be able to convert the blade arrival time into a circumferential distance of arrival, $DOA_i$, of each blade tip 34. The distance of arrival of each successive blade tip 34, $DOA_{i+1}$, may then be detected in the output signal from the sensor 24. Optionally, in some applications, the rotor 32 may be provided with a once-per-revolution (OPR) marker 38, the detection of which may be indicative of the completion of one full revolution of the rotor 32. In such applications, the distance of arrival of each blade tip 34 may be measured relative to the OPR marker 38, as indicated in FIG. 2 for example.

Figure 3:
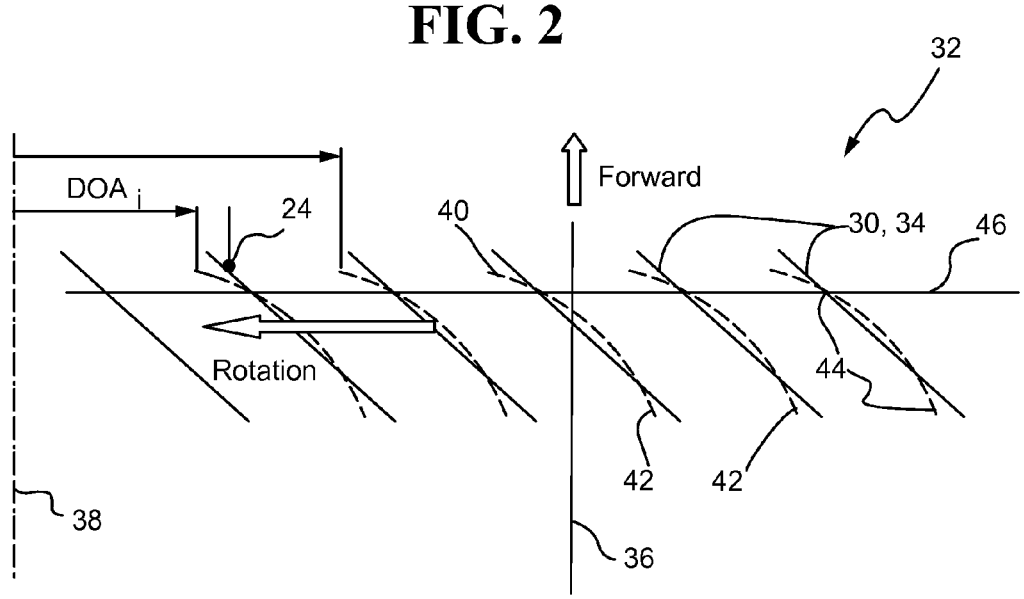
FIG. 3 is a schematic view of an implementation of a NSMS on vibrating rotor blades.

As illustrated in FIG. 3, the rotor blades 30 under certain operating conditions may vibrate and deflect the blade tip 34 to essentially form any given mode or shape. For example, in the first chord-wise vibratory mode shown in FIG. 3, the leading and trailing edges 40, 42 of the blade tips 34 may be curved toward the rotational direction of the rotor 32 in contrast to the linear blade tips 34 of FIG. 2 having no deflection. Additionally, the vibratory mode shown results in two nodes 44 of each blade tip 34 where vibratory deflection is zero. Due to the deflection shown, the sensor 24 of the NSMS 20 may perceive an earlier blade arrival time relative to the OPR marker 38, and thus, the controller 22 may calculate a shorter distance of arrival. Moreover, the difference between the distance of arrival determined under deflection in FIG. 3 and the distance of arrival determined under no deflection in FIG. 2 may correspond directly to the amount of vibratory deflection in each blade tip 34. Under such circumstances, the controller 22 may be configured to quantify or calculate the vibratory stress based on the inferred axial location of the sensor 24 relative to the rotor 32 and a predefined stress to deflection calibration ratio.

Figure 4:
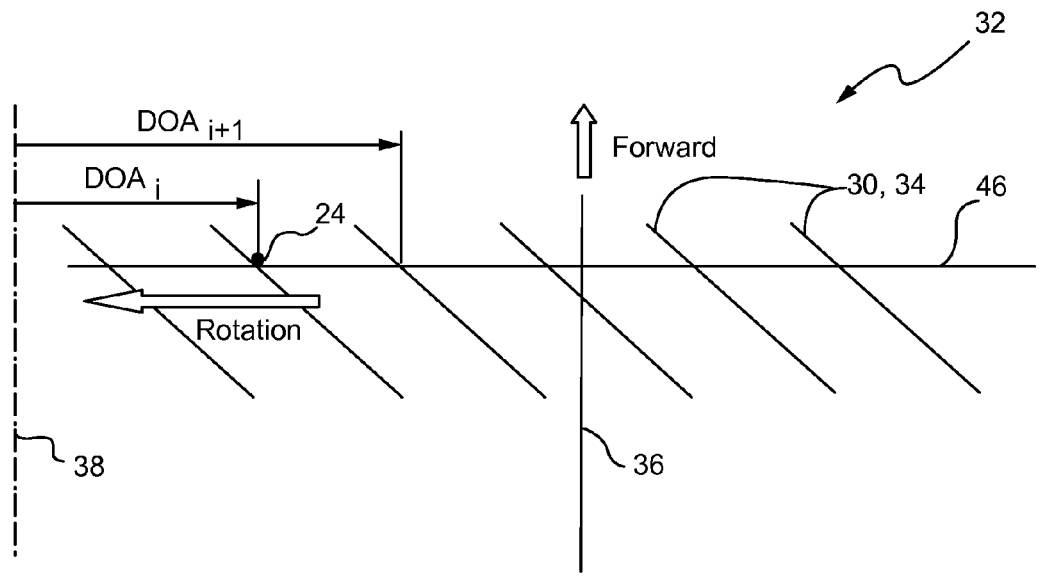
FIG. 4 is a schematic view of an implementation of a NSMS on non-vibrating rotor blades with an axial shift.

Referring now to FIG. 4, another embodiment of the NSMS 20 as applied to non-vibrating rotor blades 30 having an axial shift is provided. More particularly, as opposed to the deflected blades 30 of FIG. 3, the rotor blades 30 of FIG. 4 remain linear and unbent. In further contrast to the rotor blades 30 of FIG. 2, the blades 30 of FIG. 4 may be axially displaced, for instance, in the forward direction relative to the sensor 24 and the engine case 28 within which the sensor 24 is fixedly disposed. Specifically, the rotor 32 and the rotor blades 30 may axially shift in the forward direction as the gas turbine engine 26 operates at increased engine speeds and/or during positive acceleration. For example, the default axial position of a reference line 46, or a line of reference that is fixed relative to the blade tips 34 of FIG. 2, which was axially distanced from the sensor 24, may be axially shifted to be closer to or more or less in line with the sensor 24 in FIG. 4. The rotor blades 30 may additionally return to the default axial position, axially shifting in the reverse direction relative to the engine case 28, when the engine 26 operates at decreased engine speeds and/or under negligible or negative acceleration.

When the position of the rotor blades 30 and blade tips 34 is axially displaced as shown in FIG. 4, the blade arrival time, and thus, the distance of arrival as determined relative to the OPR marker 38 may be detected to be longer than the corresponding distance of arrival determined in FIG. 2 where no axial displacement was present. Moreover, due to the blade tip angle, or the angle of each blade tip 34 as measured relative to the rotor axis 36, and the axial shift of each blade tip 34, it takes more time and a longer distance of arrival for the sensor 24 to detect the passing blade tip 34. Based on the change in the distance of arrival and using trigonometric relationships between the blade tips 34, the rotor axis 36 and the axial displacement, the controller 22 may be able to determine whether an axial displacement has occurred. However, with unaltered or unmarked blade tips 34, the controller 22 may be unable to determine the exact axial location of the sensor 24 relative to the location along the length of the blade tips 34 or the absolute axial location of the rotor blades 30 relative to the engine case 28. Furthermore, in the presence of axial displacement, the controller 22 may be unable to evaluate blade stress, blade vibrations or vibratory deflections.

Figure 5:
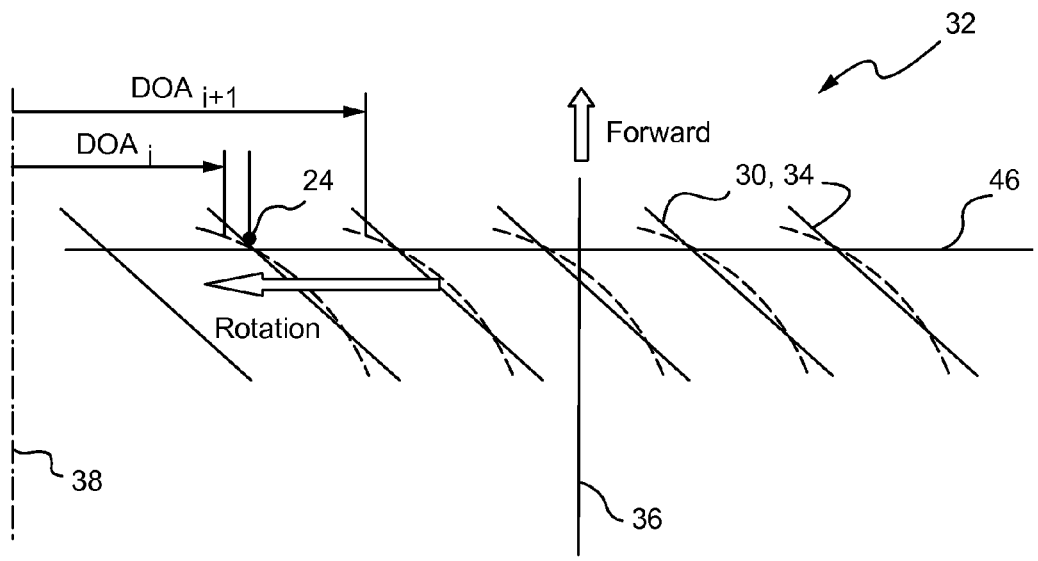
FIG. 5 is a schematic view of an implementation of a NSMS on vibrating rotor blades with an axial shift.

As shown in FIG. 5, for instance, the blade tips 34 may be both axially displaced in the forward direction relative to the sensor 24 and the engine case 28, and also deflected, for example, under a first chord-wise vibratory mode. In the particular embodiment shown, the controller 22 may perceive the blade arrival time, as well as the distance of arrival, as being shorter than the non-vibrating blades 30 of FIG. 4, but by a smaller degree as compared to the distance of arrival of the rotor blades 30 of FIG. 3 having no axial shift. Based only on the resulting distance of arrival detected, the controller 22 may incorrectly establish that the blade deflection in FIG. 5 is smaller in magnitude than that of FIG. 3, when in fact the physical vibratory mode experienced is identical in both embodiments. The controller 22 may then proceed to derive and quantify the blade stress at the high stress region of the blade 30 based on a stress to deflection calibration ratio. However, without compensating for the axial position of the rotor blades 30, applying the original stress to deflection calibration ratio may undershoot, or in other cases overshoot, the actual blade stress experienced.

The errors that may be introduced by axially displaced rotor blades 30 may be overcome by dynamically tracking the axial displacement and calibrating blade stress analyses according to the tracked axial displacement. In order to adequately track the axial position of a set of rotor blades 30, such as the spools in a gas turbine engine 26, the NSMS 20 may establish at least one known or default axial position of the blade tips 34 relative to the non-rotating reference frame of the engine case 28, and monitor any change in the axial position relative to that default position. By tracking axial shifts in the position of the rotor blades 30 and the blade tips 34, the controller 22 may be able to increase the overall accuracy and reliability of the measurements taken by the NSMS 20. Additionally, more accurate and reliable NSMS measurements may aid in the overall design and development process of the gas turbine engine 26 by, among other things, helping to reduce any uncertainties in stator to rotor clearance and to reduce the overall length of the engine 26.

Figure 6:
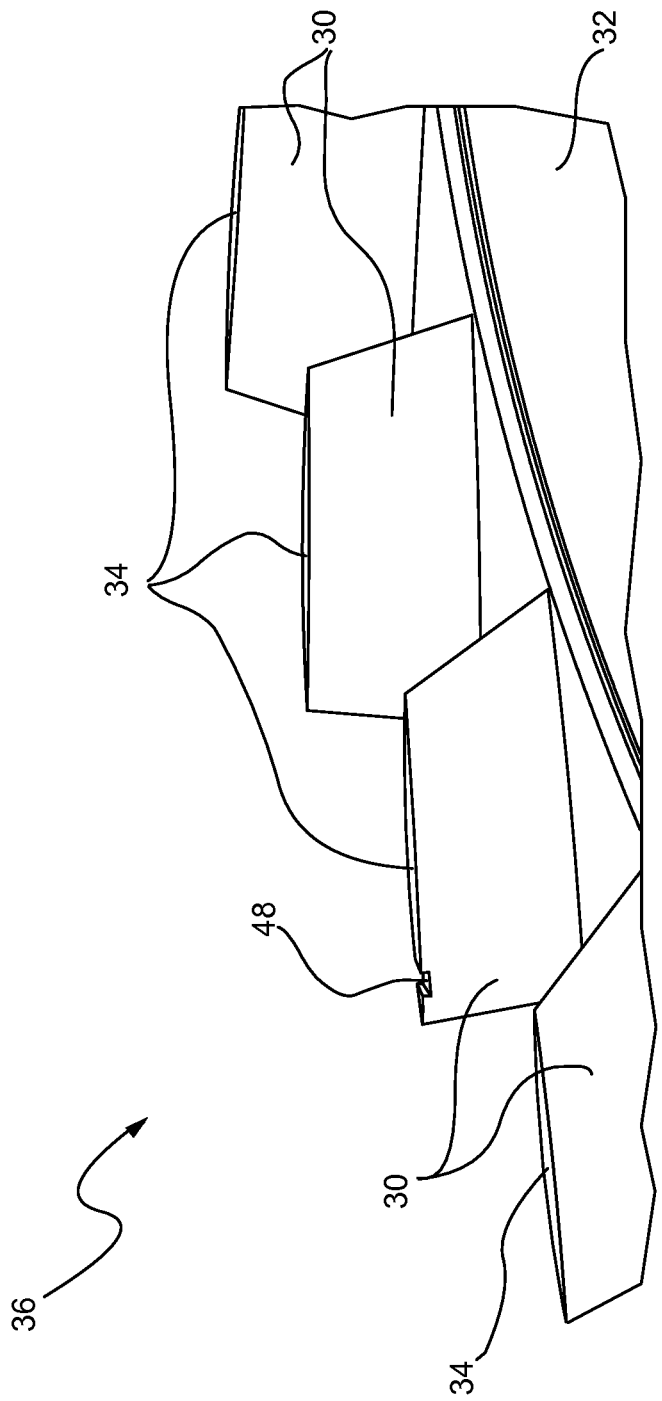
FIG. 6 is a perspective view of one exemplary position marker as provided on the blade tip of a rotor blade.

In order to facilitate detection of the axial position of a rotor blade 30 relative to the NSMS sensor 24, at least one of the rotor blades 30 may be provided with an axial position marker 48, as shown for example in FIG. 6. In the particular embodiment shown, the position marker 48 may be implemented as an inclined slot that is cut into the blade tip 34 of one of the rotor blades 30. The slot width of the position marker 48 may be substantially equal to the sensing field of the sensor 24 being used. For example, when using an optics-based sensor 24, the slot width of the position marker 48 may be substantially equal to or greater than the diameter of the optical beam that is emitted by the sensor 24. The slot floor of the position marker 48 may be configured in a manner which intentionally deters, hinders and/or prevents detection of the particularly marked rotor blade 30 by the sensor 24. For example, when using an optics-based sensor 24, the angle of inclination of the slot floor of the position marker 48 may be set at an angle that is sufficient to intentionally direct any light reflected therefrom away from the sensor 24. Alternatively, other features of the position marker 48, such as the type of surface provided on the slot floor, the slot depth, and the like, may similarly be configured to prevent detection by the NSMS 20 and its sensors 24.

As a result, when the position marker 48 passes underneath the sensor 24, the data or signals collected by the NSMS controller 22 may exhibit a temporary missing blade 30, which may further be used to identify the axial position of the rotor blades 30. The placement of the position marker 48 on the blade tip 34 may vary according to the desired application. For instance, the position marker 48 may be axially positioned on the blade tip 34 such that it aligns with the sensor 24 when the rotor blades 30 are in the default axial position and no axial displacement is present. Alternatively, the position marker 48 may be axially positioned on the blade tip 34 such that it aligns with the sensor 24 only when the rotor blades 30 are displaced from the default axial position. Other types of blade tip alterations may be similarly employed to cause a recognizable signal deviation in the output of the NSMS sensor 24 that is indicative of the axial position of the rotor blades 30 relative thereto. In other alternative embodiments, the marked blade tip 34 may be altered in a manner that can quantify the degree of axial displacement of the rotor blades 30. For example, the marked blade tip 34 may be provided with incremental structural changes which affect certain signal characteristics of the sensor output signal, such as the phase, amplitude and/or frequency thereof, in correlation with the amount of axial displacement that is present. In still further modifications, the marked blade tip 34 may be structurally altered in a manner which automatically shifts the distance of arrival according to the axial displacement present at the time of detection.

Figure 7:
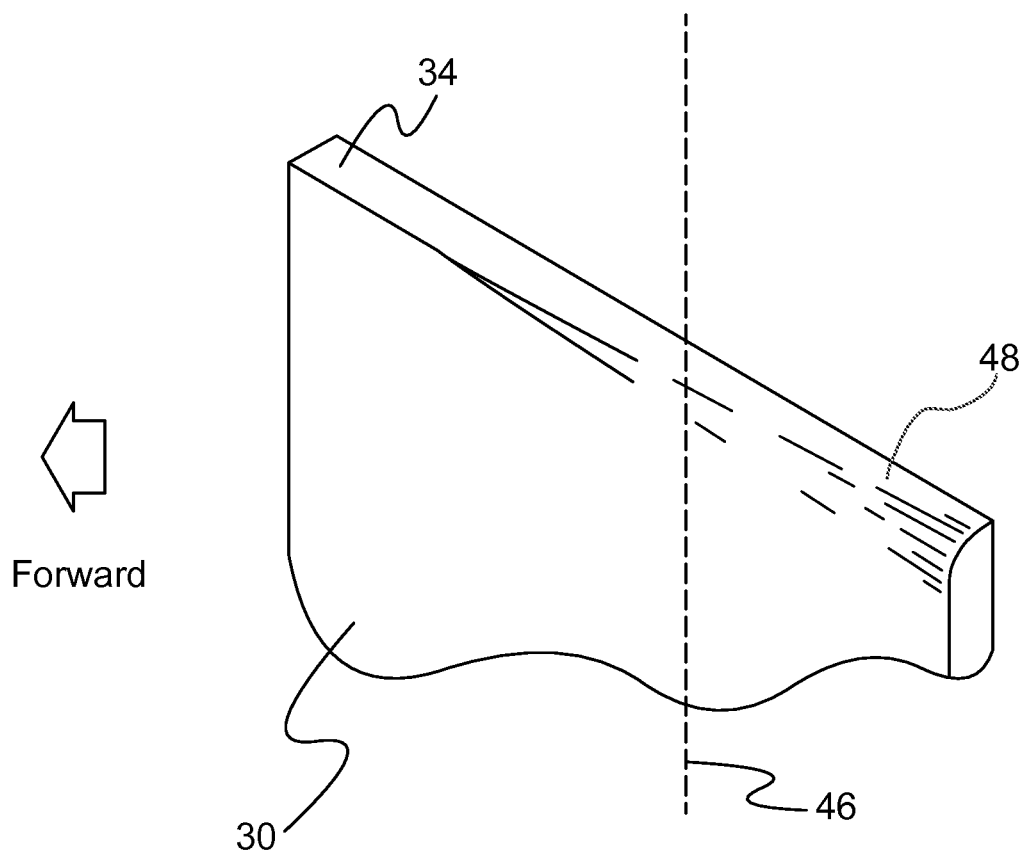
FIG. 7 is a perspective view of another exemplary position marker as provided on the blade tip of a rotor blade.

As shown for example in FIG. 7, one exemplary blade tip 34 is provided with a position marker 48 which may cause incremental changes in the output of the NSMS sensor 24 corresponding to axial displacement of the rotor blades 30. The position marker 48 may be disposed on or machined into the blade tip 34 and substantially extend the length thereof. Specifically, the position marker 48 may provide a surface that is intended to interact with the NSMS sensor 24 in a manner which incrementally increases or decreases the phase of the sensor output signal as the axial position of the position marker 48 and the rotor blades 30 is shifted from a known default position. In applications employing optics-based sensors 24, for example, the position marker 48 may include a varied edge width, edge depth, edge radius, edge curvature, and/or any other structural variation which may cause distinguishably more or less light to be reflected and correspondingly received at the sensor 24. In other alternatives, the position marker 48 may provide bevels, notches, grooves, ribs, tabs, or other suitable structural variations which may effectively modify the reflective properties of the blade tip 34, and thus, the corresponding phase of the sensor output signal. Based on the corresponding phase of the output signal generated by the sensor 24, a controller 22 associated with the particular blade tip 34 shown may be configured to not only detect whether there is an axial displacement in the position of the rotor blades 30, but also quantify the axial displacement and adjust for any blade deflection and/or blade stress evaluations accordingly. Such correlations between different possible signal variations and different axial positions of the rotor blades 30 may be preprogrammed or predefined within a memory associated with the controller 22 in the form of look-up maps, tables, or the like.

Figure 8:
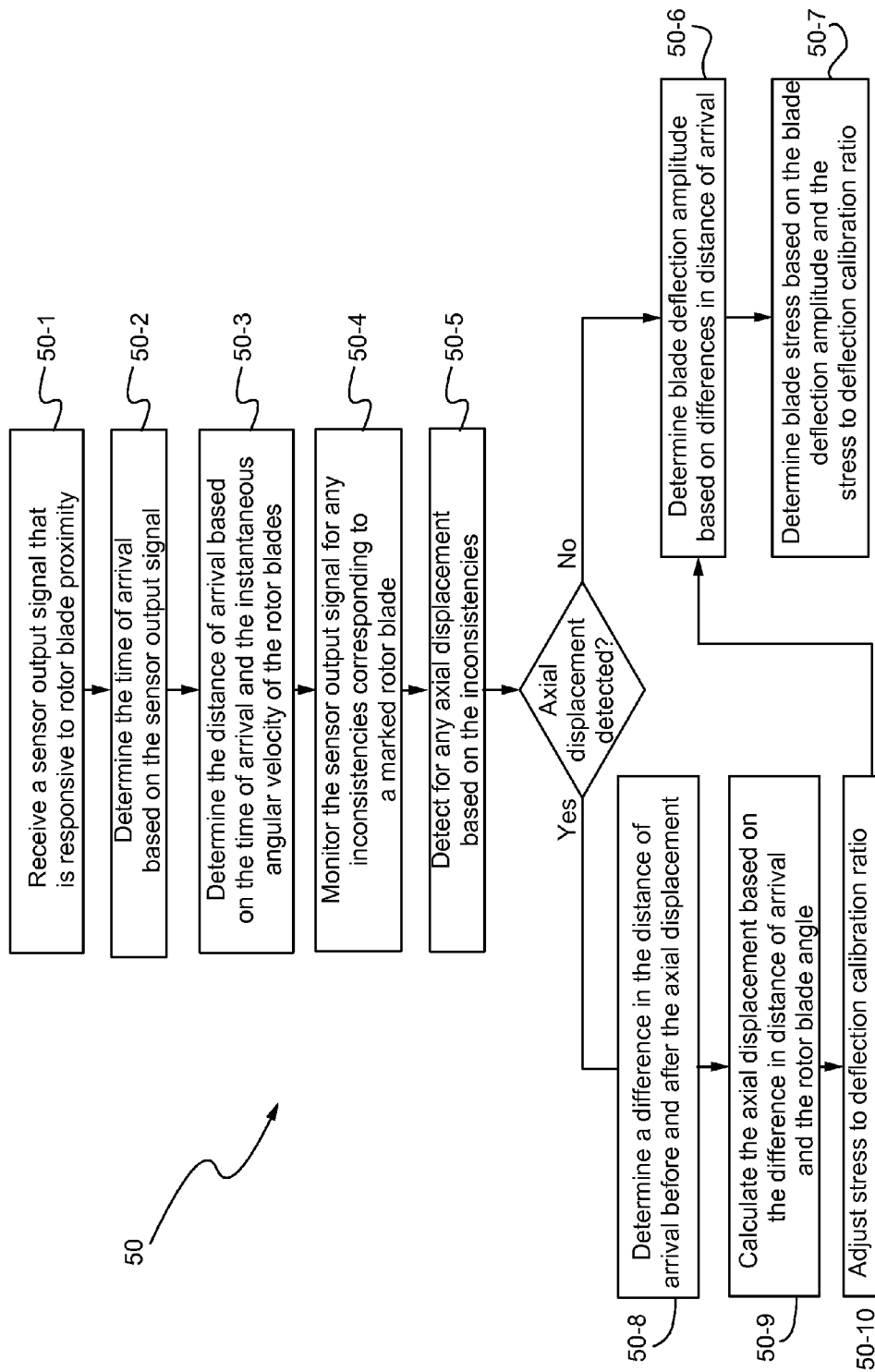
FIG. 8 is a diagrammatic view of an algorithm for determining axial displacement of a rotor.

One exemplary algorithm or method 50 by which the controller 22 may be preprogrammed to, among other things, determine axial displacement of the rotor blades 30 as well as monitor the health of the associated engine 26, is shown in FIG. 8. As an initial step 50-1, the controller 22 may receive one or more output signals that are generated by the NSMS sensor 24 of the associated gas turbine engine 26. For example, the sensor 24 may generate a continuous signal, such as an analog voltage or current signal, having a phase, amplitude and/or frequency which varies according to the proximity of the rotor blades 30 passing relative thereto. Based on the sensor output signal, the controller 22 may determine the time of arrival of the rotor blades 30 relative to the sensor 24 in step 50-2. Optionally, the controller 22 may measure the time of arrival of the rotor blades 30 with respect to the OPR marker 38, as shown in FIG. 2. In step 50-3, the controller 22 may further determine the distance of arrival of the rotor blades based on the time of arrival as determined during step 50-2 and the instantaneous angular velocity of the rotor blades 30 at the time of detection.

Still referring to FIG. 8, the controller 22 in step 50-4 may be configured to monitor the sensor output signal for any inconsistencies which may indicate the passing of a rotor blade 30 that is marked with a position marker 48. As previously discussed, when the sensor 24 interacts with the position marker 48 of a marked rotor blade 30, the sensor 24 may be caused to generate a detectable variance in certain signal characteristics of the sensor output signal. As defined herein, signal characteristics may include the phase, amplitude and/or frequency of the sensor output signal. More specifically, the size and/or location of the position marker 48 relative to the marked rotor blade 30 and the sensor 24 may be such that its interaction with the sensor 24 causes one recognizable inconsistency per revolution of the rotor 32 only when the rotor blades 30 are rotating in a known default axial position. Any axial displacement of the rotor blades 30 from this default position may axially shift the position marker 48 out of alignment with the sensor 24 and prevent interactions therebetween. In such a way, during step 50-4, the controller 22 may be configured to continuously monitor the sensor output signal for such inconsistencies and track any significant changes in, for instance, the phase of the signal, for the purposes of determining whether any significant axial displacement has occurred. It will be understood that the step of monitoring the sensor output signal, as described in step 50-4 of FIG. 8, is not necessarily performed after step 50-3 shown, but may be concurrently performed by the controller 22 during or performed before any one or more of the preceding steps of the method 50 shown.

With reference to step 50-5 of the method 50 of FIG. 8, the controller 22 may detect for any axial displacement of the rotor blades 30 based on any of the inconsistencies, or the lack thereof, observed in step 50-4. In particular, the controller 22 may track the number of inconsistencies that have been observed per revolution of the rotor 32, for instance, using the OPR marker 38 as a reference. If an inconsistency corresponding to the single marked rotor blade 30 is detected once per rotor revolution, the controller 22 may determine that no significant axial displacement exists, and proceed to optional blade stress evaluation steps 50-6 and 50-7 without providing any compensation or adjustment therefor. Specifically, if no axial displacements are present, the controller 22 during step 50-6 may determine a blade deflection amplitude based on the previously calculated distances of arrival, as previously discussed by example in accordance with FIG. 5 above. In step 50-7, the controller 22 may further determine the blade stress based on the blade vibratory deflection amplitude observed during step 50-6 and a preprogrammed stress to deflection calibration ratio. Alternately, if no inconsistencies are observed in the sensor output signal for at least one rotor revolution, the controller 22 may determine that the axial position of the rotor blades 30 is at least partially displaced and proceed to step 50-8.

Figure 9:
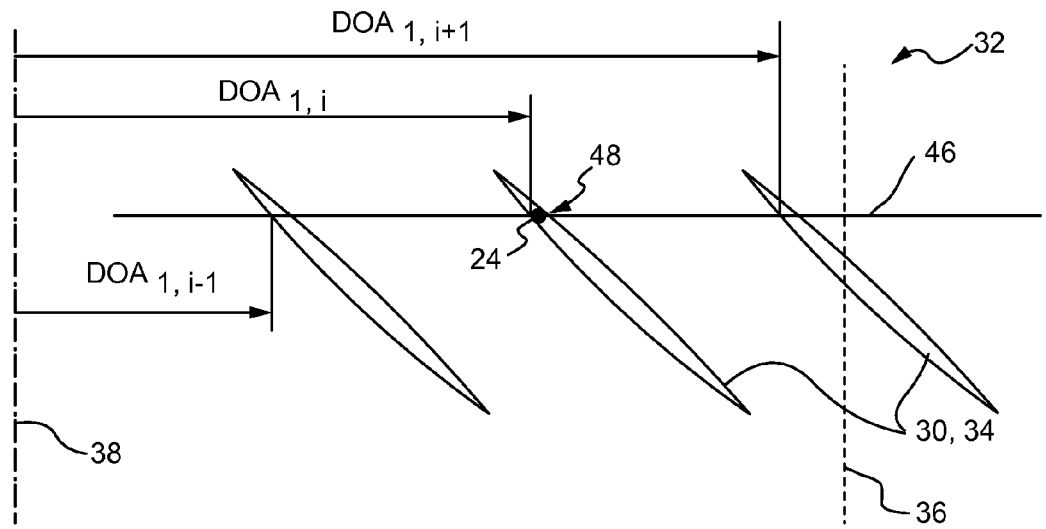
FIG. 9 is a schematic view of non-vibrating rotor blades rotating at a default axial position.
Figure 10:
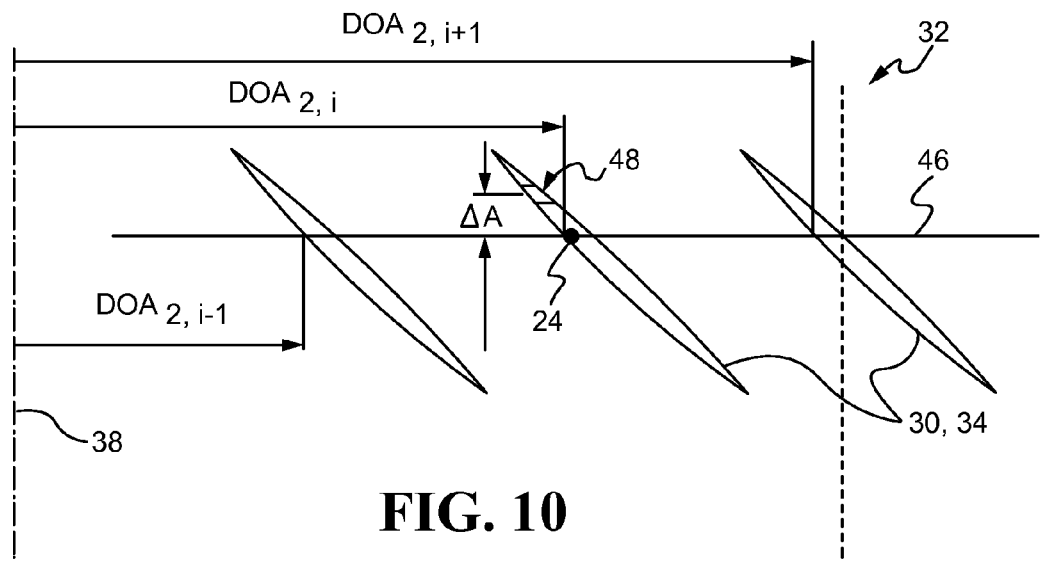
FIG. 10 is a schematic view of the non-vibrating rotor blades of FIG. 9 rotating at an axially displaced position.

Once axial displacement is detected, the controller 22 may calculate the amount of axial displacement by first determining the change in the distance of blade arrival that was caused by the axial displacement. More specifically, in step 50-8 of the method 50 of FIG. 8, the controller 22 may determine the distance of arrival detected while the rotor blades 30 rotate at the default axial position, as well as the distance of arrival detected while the rotor blades 30 are axially displaced, and further, determine a difference therebetween. As illustrated in the non-vibrating rotor blades 30 of FIG. 9, for instance, the controller 22 may determine and record a first distance of arrival, $DOA_{1,i}$, of a rotor blade 30, as well as the corresponding distance of arrival, $DOA_{1,i+1}$, of each subsequent rotor blade 30, relative to the OPR marker 38 as the rotor blades 30 rotate at the default position. Once a significant degree of axial displacement is detected, as shown in FIG. 10, the controller 22 may similarly determine and record a second distance of arrival, $DOA_{2,i}$, of a rotor blade 30, as well as the corresponding distance of arrival, $DOA_{2,i+1}$, of each subsequent rotor blade 30. The controller 22 may then calculate the difference in distance therebetween simply by subtraction, or the like.

Based on the calculated difference between the first and second distances of arrival and known trigonometric relationships of the rotor blade tips 34, the controller 22 may be able to determine or quantify the amount of axial displacement present during step 50-9 of FIG. 8. Specifically, the controller 22 may be preprogrammed with at least the rotor blade angle, or the angle, θ, the rotor blade tips 34 form with the central or rotor axis 36. In further modifications, the controller 22 may also be configured to compensate for any flexing of the rotor blades 30, and thus, any change in the rotor blade angle, which may occur under certain engine power settings. For instance, the controller 22 may be preprogrammed with a lookup table, a lookup map, or the like, which relates different engine power settings to the anticipated rotor blade angles corresponding thereto. Based on the given engine power settings and with reference to such lookup tables and/or maps, the controller 22 may be able to determine the rotor blade angle best suited for use with further analyses. Using the rotor blade angle, the controller 22 may then apply trigonometric relationships in order to calculate the axial displacement according to, for example, $$\Delta A = \frac{DOA_1 - DOA_2}{\tan\theta}, \quad (1)$$

where $\Delta A$ is the axial displacement, $DOA_1$ is the first distance of arrival of the rotor blades 30, $DOA_2$ is the second distance of arrival of the rotor blades 30, and θ is the rotor blade angle.

Upon establishing the amount of axial displacement in the rotor blades 30, the controller 22 may additionally or optionally be configured to adjust a stress to deflection calibration ratio according to the detected axial displacement in accordance with step 50-10 of FIG. 8. Specifically, the controller 22 may be preprogrammed with a stress to deflection calibration ratio configured to convert any magnitude of blade deflection detected in the rotor blades 30 into a quantified blade stress value or index. However, as the accuracy of the blade stress evaluation is dependent upon the stress to deflection calibration ratio, and as the stress to deflection calibration ratio may vary with axial displacement, the controller 22 may adjust the stress to deflection calibration ratio according to the amount of axial displacement calculated in step 50-9. The controller 22 may adjust the stress to deflection calibration ratio according to relationships predefined according to anticipated magnitudes of axial displacement and the corresponding expected changes in blade deflection and/or stress. Alternatively, the controller 22 may be preprogrammed with a lookup map and/or table which suggests an appropriate stress to deflection calibration ratio based on the detected axial displacement.

With the adjusted stress to deflection calibration ratio, the controller 22 may proceed to steps 50-6 and 50-7 in order to evaluate a level of blade stress as previously discussed. In particular, the controller 22 may determine an amplitude of blade vibratory deflection based on a calculated difference between the distances of arrival as measured before and after blade vibratory deflection has occurred in accordance with step 50-6. In step 50-7, the controller 22 may further employ the blade vibratory deflection amplitude determined in step 50-6 and the stress to deflection calibration ratio adjusted in step 50-10 in order to calculate a blade stress value or index. In such a way, for instance, by quantifying the axial position and/or displacement of the rotor blades 30 during operation of the associated gas turbine engine 26, the method 50 of FIG. 8 may enable the controller 22 to dynamically adjust the stress to deflection calibration ratio, or any suitable equivalent thereof, and improve the accuracy of blade stress evaluations and/or assessments. Moreover, by enabling determination of the absolute axial position of the rotor blades 30, the method 50 of FIG. 8 may further aid in reducing the stator to rotor clearance if any excess clearance is present. Still further, one or more steps of the method 50 may be continuously reiterated throughout operation of the gas turbine engine 26 so as to track and monitor axial shifts in the rotor blades 30 over a prolonged period of time. It will be understood that other alternatives of the method 50 of FIG. 8 will be apparent to those skilled in the art without departing from the scope of the present disclosure.

Figure 11:
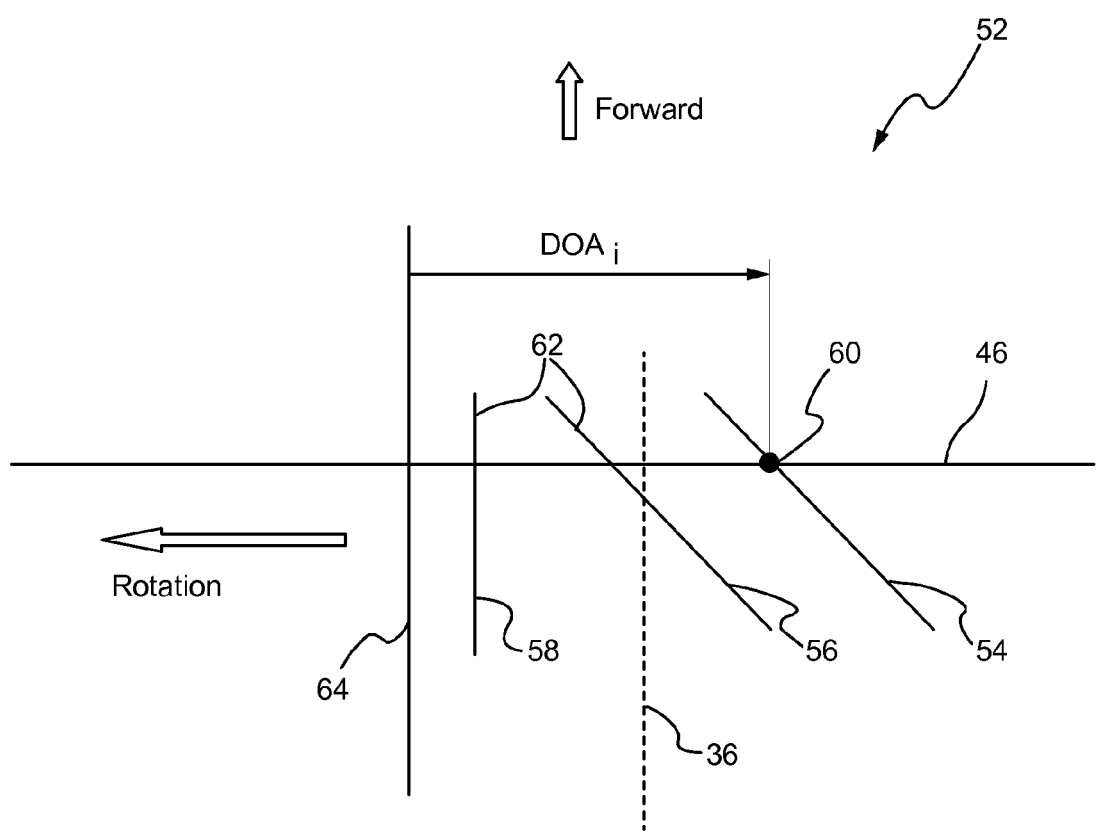
FIG. 11 is a schematic view of a non-bladed segment of a rotor having detectable markers configured for measuring axial displacement.

In still further modifications, as shown in FIG. 11 for example, similar analyses may be performed upon a non-bladed segment 52 of the rotor shaft or rotor 32 so as to provide additional insight on the axial location of the rotor 32 and the rotor blades 30. Specifically, markings such as those indicated by lines 54, 56, 58 may be disposed on the surface of any non-bladed segment 52 of the rotor 32 and configured to be visibly and/or physically detectable by one or more secondary sensors 60 situated relative thereto. In essence, the markings may be configured to interact with the sensor serve a role that is analogous to that of, for instance, the rotor blade tips 34 as previously discussed. Rather than the lines 54, 56, 58 shown in FIG. 11, the non-bladed rotor 52 may alternatively be provided with dotted lines, dashed lines, notches, grooves, indentations, or any other suitable marking that is detectable by the sensor 60 and capable of causing distinct inconsistencies or indications in the corresponding sensor output signal. Furthermore, the markings may be provided on the non-bladed rotor segment 52 by printing, etching, machining, or any other process suitable for altering the surface thereof.

Position markers 62 may also be implemented into the markings, such as in lines 56, 58, in order to provide the associated controller 22 with feedback pertaining the axial position of the non-bladed rotor segment 52 and thus the rotor 32. More specifically, the position markers 62 may be provided in the form of gaps particularly sized according to the scope of detection of the sensor 60 being used. Alternatively, the position markers 62 may take one or more of a variety of different forms. For example, short lines may be employed rather than the gaps 62 shown in FIG. 11. While the markings may be angled, as shown by lines 54, 56, which form an angle with the rotor axis 36, the non-bladed rotor segment 52 may also employ other marking configurations. For instance, the markings may be parallel with the rotor axis 36, as shown by line 58, which when operated in tandem with line 54 and observed in conjunction with the position marker 62, may provide a more accurate assessment of the axial position of the rotor 52 as well as a measurement of axial shift when position marker 62 is no longer present. As in the bladed embodiments, the non-bladed rotor segment 52 of FIG. 11 may also be provided with an OPR marker 64 with which the time and distance of arrival of the markings may be detected. In knowing the location of the absolute marker, in addition to the relative change, the controller 22 may be able to dynamically determine the axial position of non-bladed rotor segment 52 and thus the rotor 32 and the rotor blades 30 associated therewith. Even further, the controller 22 may continuously apply such techniques so as to track and monitor axial shifts in the rotor blades 30 over a prolonged period of time.

The methods and systems disclosed herein may be used with a wide range of applications directed to airfoil stress analyses of gas turbine engines typically used for the propulsion of vehicles, such as aircrafts, and the like. By determining the axial position of a gas turbine rotor based on changes to the detected proximity of rotor blades and/or markings, and by dynamically adjusting the appropriate calibration ratios according to detected changes in rotor blade proximity, the present disclosure minimizes the number of additional operations, mechanisms and components that may otherwise be required to improve the accuracy of blade stress evaluations. Furthermore, without the need for strain gauges for measuring axial displacement, the present disclosure reduces costs and improves test accuracy by eliminating the interference commonly associated with and introduced by the use of strain gauges. Moreover, the systems and methods disclosed herein may be easily implemented onto existing or new installations without requiring substantial costs.

While only certain embodiments have been set forth, alternatives and modifications will be apparent from the above description to those skilled in the art. These and other alternatives are considered equivalents and within the spirit and scope of this disclosure.

What is claimed is:

1. A method for determining axial displacement of rotor blades, comprising the steps of:
monitoring an output signal of a sensor configured to detect the proximity of the rotor blades, at least one of the rotor blades being marked with a position marker that is configured to cause a recognizable inconsistency in the output signal only when the rotor blades rotate at a known default axial position, wherein the position marker is a structural alteration on the at least one of the rotor blades, the structural alteration being an alteration of the shape of the at least one rotor blade; and
determining the axial displacement of the rotor blades if the inconsistency is not detected in the output signal for at least one full revolution of the rotor blades.

2. The method of claim 1, wherein the position marker is configured to prevent detection of the marked rotor blade by the sensor when the rotor blades are rotating in the default axial position.

3. The method of claim 1, wherein the sensor is optics-based and configured to emit light at the rotating rotor blades, the sensor being configured to detect any light that is reflected by a blade tip of the rotor blades and vary the output signal according to a magnitude of light that is detected.

4. A method for determining axial displacement of rotor blades, comprising the steps of:
monitoring an output signal of a sensor, at least one of the rotor blades being marked with a position marker that is configured to cause a recognizable inconsistency in the output signal only when the rotor blades rotate at a known default axial position, wherein the sensor is optics-based, configured to detect the proximity of the rotor blades by emitting light at the rotating rotor blades, configured to detect any light that is reflected by a blade tip of the rotor blades, and configured to vary the output signal according to a magnitude of light that is detected, and wherein the position marker is formed as a slot having a slot floor at a predefined slot depth the slot floor being inclined at an angle that is sufficient to divert any reflected light away from the sensor so as to prevent detection of the marked rotor blade; and
determining the axial displacement of the rotor blades if the inconsistency is not detected in the output signal for at least one full revolution of the rotor blades.

5. The method of claim 4, wherein the position marker includes one or more optically detectable structural variations disposed on the marked rotor blade, the structural variations being configured to interact with light emitted by the sensor and modify detectability of the marked blade such that a change in the axial displacement of the rotor blades causes a corresponding change in the perceived distance of arrival, the structural variations of the marked rotor blade including any one or more of varying edge width, edge depth, edge radius, and edge curvature.

6. The method of claim 4, further comprising the steps of determining a first distance of arrival of an unmarked rotor blade as detected at the default axial position, determining a second distance of arrival of the unmarked rotor blade as detected at an axially displaced position, and calculating the axial displacement based on a difference between the first and second distances of arrival, a rotor blade tip angle formed between an unmarked rotor blade and a central axis about which the rotor blades rotate and trigonometric relationships therebetween.

7. The method of claim 6, further comprising the step of calculating the axial displacement according to the relationship $$\Delta A = \frac{DOA_1 - DOA_2}{\tan\theta}$$

where $\Delta A$ is the axial displacement, $DOA_1$ is the distance of arrival of the unmarked rotor blade as detected at the default axial position, $DOA_2$ is the distance of arrival of the unmarked rotor blade as detected at the axially displaced position, and $\theta$ is the angle between the unmarked rotor blade tip and a central axis about which the rotor blades rotate.

8. The method of claim 4, further comprising the step of monitoring a secondary output signal of a secondary sensor configured to detect one or more markers disposed on a non-bladed rotor segment coaxially associated with the rotor blades, the markers being configured to interact with the secondary sensor in a manner which indicates the axial location of the non-bladed rotor segment.

9. The method of claim 4, further comprising the steps of determining a blade vibratory deflection amplitude based on differences between distances of arrival of vibrating rotor blades and distances of arrival of non-vibrating rotor blades, and determining blade stress based the blade deflection amplitude and a predefined stress to deflection calibration ratio, the stress to deflection calibration ratio being adjusted based on the axial displacement of the rotor blades.

10. A system for determining axial displacement of rotor blades, comprising:
 a sensor configured to generate an output signal corresponding to the proximity of the rotor blades, at least one of the rotor blades being marked with a position marker that is configured to cause a recognizable inconsistency in the output signal only when the rotor blades rotate at a known default axial position, wherein the position marker is a structural alteration on the at least one of the rotor blades, the structural alteration being an alteration of the shape of the at least one rotor blade; and
 a controller in communication with the sensor, the controller being configured to monitor the output signal of the sensor for any inconsistencies, and determine the axial displacement of the rotor blades if the inconsistency is not detected in the output signal for at least one full revolution of the rotor blades.

11. The system of claim 10, wherein the position marker is configured to prevent detection of the marked rotor blade by the sensor when the rotor blades are rotating in the default axial position.

12. A system for determining axial displacement of rotor blades, comprising:
 a sensor configured to generate an output signal corresponding to the proximity of the rotor blades, at least one of the rotor blades being marked with a position marker that is configured to cause a recognizable inconsistency in the output signal only when the rotor blades rotate at a known default axial position, wherein the sensor is optics-based and configured to emit light at the rotating rotor blades, the sensor being configured to receive any light that is reflected by a blade tip of the rotor blades, the output signal varying in response to a magnitude of light received, and wherein the position marker is formed as a slot having a slot floor at a predefined slot depth and width, the slot floor being inclined at an angle that is sufficient to divert any reflected light away from the sensor so as to prevent detection of the marked rotor blade; and
 a controller in communication with the sensor, the controller configured to monitor the output signal of the sensor for any inconsistencies, to interpret variances in the output signal as detection of one of the rotor blades, and to determine the axial displacement of the rotor blades if the inconsistency is not detected in the output signal for at least one full revolution of the rotor blades.

13. The system of claim 12, wherein the position marker includes one or more optically detectable structural variations disposed on the marked rotor blade, the structural variations being configured to interact with light emitted by the sensor and modify detectability of the marked blade such that a change in the axial displacement of the rotor blades causes a corresponding change in a magnitude of light that is reflected by the position marker and received by the sensor, the structural variations of the marked rotor blade including any one or more of varying edge width, edge depth, edge radius, and edge curvature.

14. The system of claim 12, wherein the controller is configured to determine a first distance of arrival of an unmarked rotor blade as detected at the default axial position, determine a second distance of arrival of the unmarked rotor blade as detected at an axially displaced position, and calculate the axial displacement based on a difference between the first and second distances of arrival, a rotor blade tip angle formed between an unmarked rotor blade tip and a central axis about which the rotor blades rotate, and trigonometric relationships therebetween.

15. The system of claim 14, wherein the controller is configured to calculate the axial displacement according to the relationship $$\Delta A = \frac{DOA_1 - DOA_2}{\tan\theta}$$

where $\Delta A$ is the axial displacement, $DOA_1$ is the distance of arrival of the unmarked rotor blade as detected at the default axial position, $DOA_2$ is the distance of arrival of the unmarked rotor blade as detected at the axially displaced position, and $\theta$ is the angle between the unmarked rotor blade tip and a central axis about which the rotor blades rotate.

16. The system of claim 12, further comprising a secondary sensor that is in communication with the controller and configured to detect one or more markers disposed on a non-bladed rotor segment coaxially associated with the rotor blades, the markers being configured to interact with the secondary sensor in a manner which indicates the axial location of the non-bladed rotor segment to the controller.

17. The system of claim 12, wherein the controller is configured to determine a blade vibratory deflection amplitude based on differences between distances of arrival of vibrating rotor blades and distances of arrival of non-vibrating rotor blades, and determine blade stress based the blade deflection amplitude and a predefined stress to deflection calibration ratio, the controller adjusting the stress to deflection calibration ratio based on the axial displacement of the rotor blades.

18. The system of claim 12, further comprising a dedicated sensor configured to detect a position marker only when the rotor blades are axially displaced from the default axial position.

19. The system of claim 12, wherein the controller is configured to continuously track the axial location of the rotor blades relative to the sensor.

20. The system of claim 12, wherein the one or more optically detectable structural variations disposed on the marked rotor blade are incremental structural variations which affect certain characteristics of the output signal.

* * * * *